3,810,901
3-(COUMARIN-3-YLPHENYL)-1,2,4-OXADIAZOL-5-YL AMMONIUM SALTS

Hugh Davidson, Castleford, and Brian Ernest Leggetter, Wakefield, England, assignors to Hickson & Welch Limited, Castleford, England
No Drawing. Filed Feb. 10, 1972, Ser. No. 225,336
Claims priority, application Great Britain, Feb. 11, 1971, 4,465/71
Int. Cl. C07d 85/52
U.S. Cl. 260—293.58    13 Claims

ABSTRACT OF THE DISCLOSURE 3-(coumarin-3-ylphenyl)-1,2,4-oxadiazol-5-yl ammonium salts which may have an alkyl substituent at the 7 and/or 4 position of the coumarin ring and/or a non-chromophoric group (e.g. halogen, alkyl or alkoxy) at another position of the coumarin ring.

The compounds are useful in the whitening, brightening and/or bleaching of synthetic and semi-synthetic fibres.

---

This invention is concerned with new chemical compounds for use in the whitening, brightening and/or bleaching of synthetic and semi-synthetic materials in particular materials in the form for example of textile yarns and fibres, synthetic resin sheets and the like.

Optical whitening agents have in recent years found extensive use in the treatment of textile yarns and fibres, both in their preparation and during washing, and are designed in general to counteract the yellow or off-white color which white textiles may develop. Such optical whitening agents also tend to improve colored textiles as they impart a general brightness to them.

The present invention is based upon the discovery of certain 3-(coumarin-3-ylphenyl)-1,2,4-oxadiazol-5-yl ammonium salts which have particularly advantageous properties in the whitening, brightening and/or bleaching of synthetic and semi-synthetic textile fibres and other materials.

According to one feature of the present invention, there are provided compounds of the general formula:

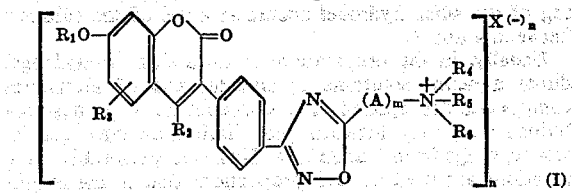

wherein $R_1$ is a hydrogen atom or a substituted or unsubstituted alkyl group; $R_2$ is a hydrogen atom or a substituted or unsubstituted alkyl group (e.g., a methyl group). $R_3$ is a non-chromophoric group (e.g., a hydrogen or halogen atom or a lower alkyl or alkoxy group); $R_4$, $R_5$ and $R_6$ are the same or different and each is as a substituted or unsubstituted alkyl group, $R_4$, $R_5$ and $R_6$ together with the adjacent nitrogen atom form a substituted or unsubstituted nitrogen-containing aromatic ring (e.g. a pyridine ring), or two of $R_4$, $R_5$ and $R_6$ together with the adjacent nitrogen atom form an aliphatic substituted or unsubstituted heterocyclic ring (e.g. an aliphatic substituted or unsubstituted 5- or 6-membered heterocyclic ring, such as piperidine; the ring may if desired contain a further hetero atom) with the remaining $R_4$, $R_5$ or $R_6$ group being a substituted or unsubstituted alkyl group; A is an alkylene or arylene group; $m$ is 0 or 1; X is the anion of an organic or inorganic acid, and $n$ is the valency of the said anion.

Alkyl groups in the compounds of the invention may for example be lower alkyl groups having 1-6 carbon atoms. $R_3$ may for example be a lower alkyl or alkoxy group having 1-6 carbon atoms at the 5-position of the coumarin group. When $R_4$, $R_5$ and $R_6$ are substituted alkyl groups, the substituent may for example be a hydroxy, carbethoxy or carboxy group. When $R_4$, $R_5$ and $R_6$ and the nitrogen atom form an aliphatic heterocyclic ring, the ring may contain oxygen as a further hetero atom and may be substituted for example by an alkyl group having 1-6 carbon atoms. Similarly, when $R_4$, $R_5$ and $R_6$ and the nitrogen atom represent an aromatic ring, the ring may be substituted by an alkyl group having 1-6 carbon atoms. A for example may be an alkylene group having 1-6 carbon atoms or a monocyclic arylene group such as a phenylene group.

Preferred are: Compounds wherein one or more of $R_1$, $R_2$, $R_4$, $R_5$, and $R_6$ is an alkyl group having 1-6 carbon atoms; and/or $R_4$, $R_5$, and $R_6$ form a nitrogen-containing heterocyclic ring which may be unsubstituted or substituted by an alkyl group having 1-6 carbon atoms; and/or A is an alkylene group having 1-6 carbon atoms or a monocyclic arylene group;

Compounds wherein $R_1$ is a methyl or ethyl group;
Compounds wherein $R_2$ is a methyl group;
Compounds wherein $R_3$ is a hydrogen or halogen atom or an alkyl or alkoxy group having 1-6 carbon atoms; such as those wherein $R_3$ is a methoxy group;

Compounds wherein $R_4$, $R_5$, and $R_6$ each is a methyl or ethyl group, or together with the adjacent nitrogen atom represent a pyridyl group which may be unsubstituted or substituted by an alkyl group having 1-6 carbon atoms; such as those wherein the pyridyl group is substituted at the 2- or 4-position by a methyl group;

Compounds wherein $R_4$, $R_5$ or $R_6$ is a 2-hydroxyethyl or carbethoxy methyl group, or wherein two of said groups together with the nitrogen atom is a piperidinyl group;

Compounds wherein A is a methylene or ethylene group; and

Compounds wherein X is a halide or methosulphate ion.

The compounds according to the invention have especially advantageous properties in the whitening, brightening and/or bleaching of textile yarns and fibres, in particular, synthetic textile fibres (e.g. cellulose acetate and acrylic fibres).

The compounds according to the invention are generally water-soluble giving a violet blue fluorescence when in solution in water. They may be used with particular advantage in the whitening, brightening and/or bleaching of cellulose acetate and acrylic fibres, if desired in the presence of a non-ionic or cationic surface active agent. However the compounds according to the invention are in general incompatible with anionic surface active agents. Fibres may be treated with compounds according to the invention, for example, in chlorite bleaching baths since such compounds have been found in general to exhibit high stability to these bleaching baths. Furthermore, the compounds according to the invention show good light stability. The use of compounds according to the invention in the optical whitening, brightening and/or bleaching of textile fibres thus enables fabrics made from such fibres having good whitness and/or brightness to be produced.

It will be understood that the invention also includes a composition for use in the treatment of an at least in part synthetic textile material comprising a compound of the Formula I and a carrier, preferably a liquid carrier such as water. As indicated above, the composition may further contain a surface active agent or a bleach.

Preferred compounds of Formula I by virtue of their optical withening, brightening and/or bleaching properties include those wherein $R_1$ represents a methyl or ethyl group, $R_3$ represents a methoxy group at the 5-position of the coumarin group, $R_4$, $R_5$ and $R_6$ each represents a methyl, ethyl, carbethoxymethyl or 2-hydroxyethyl group or $R_4$, $R_5$ and $R_6$ together with the adjacent nitrogen atom represents a pyridyl or lower alkyl substituted (e.g. 2- or 4-methyl pyridyl group, or two of $R_4$, $R_5$ and $R_6$ represent a piperidinyl group. A represents a methylene or ethylene and $X^-$ represents a halide ion (e.g. a chloride, bromide or iodide ion) or a methosulphate ion.

Examples of these compounds are

N-3-[4-(7-ethoxycoumarin-3-yl)phenyl]-1,2,4-oxadiazol-5-yl methylpyridinium chloride;
N,N,N-trimethyl-N-3-[4-(7-ethoxycoumarin-3-yl) phenyl]-1,2,4-oxadiazol-5-yl-methylammonium iodide;
N,N,N-trimethyl-N-3-[4-(7-ethoxycoumarin-3-yl) phenyl]-1,2,4-oxadiazol-5-yl methylammonium methosulphate; and
N,N-bis(2-hydroxyethyl)-N-methyl-N-(3-(4-(7-ethoxycoumarin-3-yl)phenyl)-1,2,4-oxadiazol-5-yl)methyl-ammonium methosulphate.

The compounds according to the invention may be prepared by any convenient method. We have found it convenient, for example, to prepare the compounds according to the invention by reacting a compound of formula

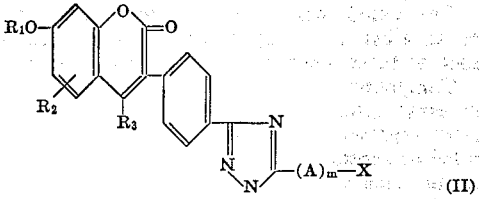
(II)

(wherein $R_1$, $R_2$, $R_3$, m and A are as hereinbefore defined and X represents a halogen atom) with an amine of formula $NR_4R_5R_6$ (wherein $R_4$, $R_5$ and $R_6$ are as hereinbefore defined). The reaction is conveniently effected in an organic solvent, for example in the amine of formula $NR_4R_5R_6$, if desired in the presence of a co-solvent such as, for example, a lower alkanol e.g. n-butanol. In general, the reaction is preferably effected at an elevated temperature, for example at a temperature of from 90° to 135° C. or, where a co-solvent is used, up to the reflux temperature of the solvent system.

The reaction of the compound of Formula II with the amine of formula $NR_4R_5R_6$ generally produces a compound of Formula I wherein the anion $X^{(-)n}$ is derived from the compound of Formula II and in such cases the reaction is most conveniently used for the preparation of compounds of Formula I wherein $X^{(-)n}$ represents a halide ion. However, if it is desired to prepare compounds of Formula I wherein $X^{(-)n}$ represents other than a halide ion, a compound of Formula I wherein $X^{(-)n}$ represents a halide ion may be converted into a compound of Formula I, wherein $X^{(-)n}$ is other than a halide ion, by known methods. Such methods may, if desired, also be used for converting a compound of Formula I wherein $X^{(-)n}$ represents one halide ion into another compound of Formula I wherein $X^{(-)n}$ represents a different halide ion.

Compound of Formula I wherein $R_4$, $R_5$ and $R_6$ together with the adjacent nitrogen atom represent other than an aromatic ring, and in particular those wherein $X^-$ represents other than a halide ion, may conveniently be prepared by reacting a compound of formula

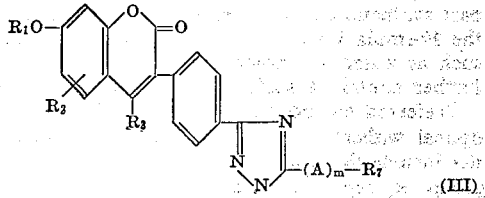
(III)

(wherein $R_1$, $R_2$, $R_3$, m and A are as hereinbefore defined and $R_7$ represents a group of the formula $-NR_4R_5$, or $-NR_5R_6$) with a compound of formula $R_8X_n$ (wherein $R_8$ represents a substituted or unsubstituted alkyl group and X and n are hereinbefore defined). The reaction is conveniently effected in an organic solvent, for example a lower alkanol e.g. butanol advantageously at an elevated temperature for example, under reflux. Again the $X^{(-)n}$ anion of the compound of Formula I first obtained can if desired be exchanged for other anions.

The compounds according to the invention may also be prepared by reacting a compound of formula

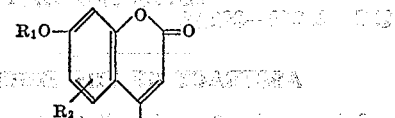
(IV)

(wherein $R_1$, $R_2$ and $R_3$ are as hereinbefore defined) with a diazonium salt of formula

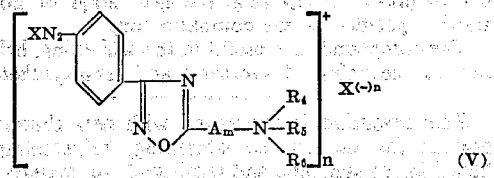
(V)

(wherein $R_4$, $R_5$, $R_6$, A, m, X and n are as hereinbefore defined). The reaction is preferably effected in a solvent, for example an aqueous alcoholic solvent.

The compounds of Formula II used in the preparation of the compounds of Formula I may be prepared by known methods for example by reacting an amidoxime of formula

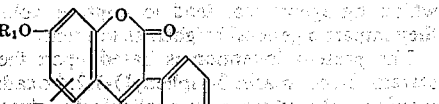
(VI)

(wherein $R_1$, $R_2$ and $R_3$ are as hereinbefore defined) with a functional derivative of a carboxylic acid of formula $X-(A)_m-CO_2H$ (wherein X, A and m are as hereinbefore defined). The functional derivative of the carboxylic acid may, for example, be an acid halide, e.g. the acid chloride, anhydride or amide. Orthoesters of carboxylic esters may also be used to cyclize compounds compounds of Formula VI. The compounds of Formula VI may be prepared by known methods, conveniently by reaction of a nitrile of formula

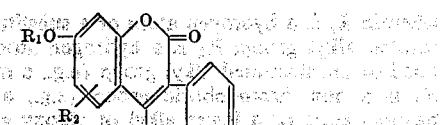
(VII)

(wherein $R_1$, $R_2$ and $R_3$ are as hereinbefore defined) with hydroxylamine or by reaction of a thioamide of formula

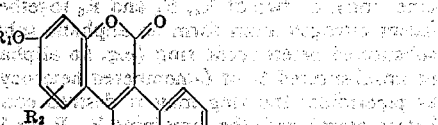
(VIII)

(wherein $R_1$, $R_2$ and $R_3$ are as hereinbefore defined) with hydroxylamine. The thioamide of Formula VIII may be prepared, for example by reaction of a nitrile of Formula VII with hydrogen sulphide.

The compounds of Formula VII may be prepared, for example, according to the method described in British Pat. No. 1,152,875.

The compounds of Formula III used in the preparation of compounds according to the invention may be prepared by known methods, for example by reacting a compound of Formula VI with a functional derivative of a carboxylic acid of formula $R_8ACO_2H$ (wherein $R_8$ and A are as hereinbefore defined).

The compounds of Formulae II, III and VII may also be prepared by reacting a compound of Formula IV with a diazonium salt of formula

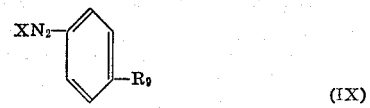
(IX)

(wherein X is as hereinbefore defined and $R_9$ represents a group of formula

wherein A, X and $R_7$ are as hereinbefore defined).

The following examples are given by way of illustration only. All parts are by weight unless otherwise stated.

EXAMPLE 1

N-{3-[4-(7-ethoxycoumarin-3-yl)phenyl]-1,2,4-oxadiazol-5-ylmethyl}pyridinium chloride (a) 3-[4-(5-chloromethyl)-1,2,4 - oxadiazol - 3 - yl] phenyl-7-ethoxycoumarin.—58.2 parts of 3 - (4-cyanophenyl)-7-ethoxycoumarin, 27.8 pts. of hydroxylamine hydrochloride, and 29.0 pts. of sodium carbonate were heated in 300 pts. of pyridine on a boiling water bath for 2 hrs. and then poured into 1,000 pts. of cold water. The off-white solid produced was filtered off, washed with water and dried to give 60.3 pts. of 4-(7-ethoxycoumarin-3-yl)benzamidoxime, m. pt. 220° C. The amidoxime obtained was added to 56.6 pts. of chloroacetyl chloride in 600 pts. of o-dichlorobenzene, stirred 1 hr. at room temperature and then the water distilled off over 2 hrs., the temperature rising to 160° C. The mixture was then refluxed for 4 hrs., cooled and distilled with steam. The solid material was collected and re-crystallized from n-butanol to give 99 pts. of 3-[4-(5-chloromethyl)-1,2,4-oxadiazol - 3 - yl] - 7 - ethoxycoumarin as pale yellow crystals, m. pt. 177° C.

(b) 30.6 pts. of 3 - [4 - (5-chloromethyl)-1,2,4,-oxadiazol-3-yl]phenyl - 7 - ethoxycoumarin and 90 pts. of pyridine were heated together at 100° C. for 5 mins., cooled and the solid collected, washed with acetone and recrystallized from methanol to give N-{3-[4-(7-ethoxycoumarin-3-yl)phenyl]-1,2,4 - oxadiazol - 5 - ylmethyl} pyridinium chloride as a very pale cream powder, m. pt. 217° C., $\lambda_{max.}$ 348 m$\mu$, $E_1^1$ 610. A dilute solution of this compound in water exhibited a blue-violet fluorescence.

EXAMPLE 2

N,N,N-triethyl-N-{3-[4-(7-ethoxycoumarin-3-yl)phenyl]-1,2,4-oxadiazol-5-yl methyl}ammonium chloride 38.0 parts of 3 - [4 - (5-chloromethyl)-1,2,4-oxadiazol-3-yl]phenyl-7-ethoxycoumarin (prepared as in Example 1) in 250 pts. of n-butanol were refluxed with 28 pts. of triethylamine for 5 hrs., cooled and filtered. The filtrate was poured into 1,000 pts. of light petroleum (b .pt. 40–60° C.) and the precipitated solid was collected and recrystallized from methanol to give N,N,N-triethyl-N-{3-[4-(7-ethoxycoumarin - 3 - yl)phenyl]-1,2,4-oxadiazol-5-yl}methyl ammonium chloride, m. pt. 214° C., $E_1^1$ 660.

EXAMPLE 3

N-{3-[4-(7-ethoxycoumarin-3-yl)phenyl]-1,2,4-oxadiazol-5-yl}ethyl pyridinium chloride (a) 3 - [4 - (5 - chloroethyl) - 1,2,4-oxadiazol-3-yl] phenyl-7-ethoxycoumarin.—50 parts of 2-chloropropionyl chloride and 30 parts of 4-(7-ethoxycoumarin-3-yl)-benzamidoxime (prepared as in Example 1) were heated at 130° C. until the reaction mixture became homogeneous and then maintained at 130° C. for a further 40 mins. The reaction mixture was then poured into 700 parts cold water and the resulting solid was collected, washed with cold water and recrystallized from acetic acid to give 23 parts of 3-[4-(5-chloroethyl)-1,2,4 - oxadiazol - 3 - yl] phenyl-7-ethoxycoumarin. The pale yellow crystals melted at 178° (dec.) $\lambda_{max.}$ 348 m$\mu$, $E_1^1$ 810.

(b) 8 parts of 3 - [4 - (5-chloroethyl)-1,2,4-oxadiazol-3-yl]phenyl-7-ethoxycoumarin and 15 parts of pyridine were heated to 120–130° C. for 90 mins., cooled and poured into 200 parts of acetone. The solid was collected and digested with 200 parts of boiling ethanol. The insoluble material was filtered off and the filtrate was concentrated to small bulk and triturated with acetone. The precipitated solid was recrystallized from n-butanol to give N - {-[4-(7-ethoxycoumarin-3-yl)phenyl]-1,2,4-oxadiazol-5-yl}ethyl pyridinium chloride as a pale cream powder, m. pt. 222–224°, $\lambda_{max.}$ 348 m$\mu$, $E_1^1$ 620.

EXAMPLE 4

N-{3-[4-(7-ethoxycoumarin-3-yl)phenyl]-1,2,4-oxadiazol-5-yl}methyl-2-methylpyridinium chloride N - {3 - [4 - (7-ethoxycoumarin-3-yl)phenyl]-1,2,4-oxadiazol-5-yl}methyl-2 - methylpridinium chloride was prepared as a cream powder, m. pt. 208–209° C. (EtOH), $\lambda_{max.}$ 348 m$\mu$, $E_1^1$ 630, in an analogous manner to Example 1 using α-picoline instead of pyridine.

EXAMPLE 5

N-{3-[4-(7-ethoxycoumarin-3-yl)phenyl]-1,2,4-oxadiazol-5-yl}methyl-4-methylpyridinium chloride N - {3 - [4 - (7-ethoxycoumarin-3-yl)phenyl]-1,2,4-oxadiazol - 5 - yl}methyl-4-methylpyridinium chloride, m. pt. 195° C. (EtOH), $\lambda_{max.}$ 348–349 m$\mu$, $E_1^1$ 640, was prepared in an analogous manner to the method of Example 1 using γ-picoline instead of pyridine.

EXAMPLE 6

N - {3-[4-(7-methoxycoumarin-3-yl)phenyl]-1,2,4-oxadiazol-5-yl}methylpyridinum chloride (a) 3-[4-(5-chloromethyl-1,2,4-oxadiazol-3-yl)phenyl]-7-methoxycoumarin.—4.2 parts of 3-(4-aminophenyl)-5-chloromethyl-1,2,4-oxadiazole were dissolved in 12 parts of concentrated hydrochloric acid and 50 parts of water were treated at 20° C. with an aqueous solution of 1.5 parts of sodium nitrite. The resulting diazonium salt was added at 35° C. to a stirred solution of 3.6 parts of 7-methoxycoumarin in 200 parts of acetone containing 0.05 part of quinol and 0.5 part of cuprous chloride in 6 parts of water. After allowing the reaction mixture to stand for 3 hrs. the resulting solid was collected and recrystallized from n-butanol to give 3-[4-(5-chloromethyl-1,2,4-oxadiazol-3-yl)phenyl]-7-methoxycoumarin, m. pt. 220–2° C.

(b) The chloromethyl compound was heated with pyridine as in Example 1 to give N-{3-[4-(7-methoxycoumarin - 3 - yl)phenyl]-1,2,4-oxadiazol-5-yl}methylpyridinium chloride, pale cream solid, m. pt. 227–9° C. (dec. from butanol/ethanol). $\lambda_{max.}$ 348 m$\mu$, $E_1^1$ 640.

EXAMPLE 7

N - {3-[4-(7-hydroxycoumarin-3-yl)phenyl]-1,2,4-oxadiazol-5-yl}methylpyridinium chloride 3 - [4 - (5 - chloromethyl) - 1,2,4-oxadiazol-3-yl]-7-hydroxycoumarin, m. pt. 250–2° C. (from n-BuOH) was prepared from 7-hydroxycoumarin by an analogous process to that of Example 6(a) and after treatment with pyridine accorded N-{3-[4-(7-hydroxycoumarin-3-yl)phenyl]-1,2,4-oxadiazol-5-yl}methylpyridinum chloride, m. pt. 265–7° C. (decomp.).

EXAMPLE 8

N,N,N - trimethyl-N-{3-[4-(7-ethoxycoumarin-3-yl)phenyl]-1,2,4-oxadiazol-5-yl} methylammonium iodide A mixture of 10 parts of 3-[4-(5-chloromethyl-1,2,4-oxadiazol-3-yl)phenyl]-7-ethoxycoumarin, 12 parts of a 25–30% aqueous solution of dimethylamine and 50 parts butanone was heated to reflux for 15 minutes, cooled and the resulting solid was collected, washed with water and crystallized from n-butanol. A yield of 7.1 parts of 3-[4-(5 - dimethylaminomethyl-1,2,4-oxadiazol-3-yl)-phenyl]-7-ethoxycoumarin, m. pt. 158–9° C. was obtained. 3 parts of this compound in 20 parts butanol were refluxed with 1.5 parts of iodomethane for 30 minutes and the resulting pale yellow solid was collected, washed thoroughly with acetone and dried. The yield was 3.9 parts of N,N,N-trimethyl - N - {3-[4-(7-ethoxycoumarin-3-yl)phenyl]-1,2,4-oxadiazol-5-yl}-methylammonium iodide, m. pt. 221–3° C. (decomp.). $\lambda_{max}$. 349 m$\mu$, $E_1^1$ 560.

EXAMPLE 9

N,N,N - trimethyl-N-{3-[4-(7-ethoxycoumarin-3-yl)phenyl] - 1,2,4 - oxadiazol-5-yl}methylammonium methosulphate By substituting dimethylsulphate for iodomethane in the method of Example 8 were obtained 3.9 parts of the corresponding methosulphate, m. pt. 242–4° C., $\lambda_{max}$. 348–9 m$\mu$, $E_1^1$ 560.

EXAMPLE 10

N - (3-(4-(7-methoxy-4-methylcoumarin-3-yl)phenyl)-1,2,4-oxadiazol-5-yl)methyl)-pyridinium chloride This compound was prepared by the method of Example 1, using 3-(4-cyanophenyl)-7-methoxy-4-methylcoumarin instead of 3-(4-cyanophenyl)-7-ethoxy-coumarin.
M. pt. 263–4° C.
$\lambda_{max}$. 358 m$\mu$, $E_1^1$ 644.

EXAMPLE 11

N-(3-(4-(5,7-dimethoxy coumarin-3-yl)phenyl)-1,2,4-oxadiazol-5-yl) methyl)-pyridinium chloride This compound was prepared by the method of Example 1, using 3-(4-cyanophenyl)-5,7-dimethoxy coumarin.
M. pt. 218–221° C. (decomp.).
$\lambda_{max}$. 358 m$\mu$, $E_1^1$ 644.

EXAMPLE 12

N - carbethoxymethyl - N,N-dimethyl-N-(3-(4-(7-ethoxycoumarin - 3 - yl)phenyl)-1,2,4-oxadiazol-5-yl)methylammonium bromide This compound was prepared by the method of Example 8, using ethyl bromoacetate instead of iodomethane.
Yield 3.5 parts.
M. pt. 180° C.
$\lambda_{max}$. 348 m$\mu$, $E_1^1$ 562.

EXAMPLE 13

N - 2 - Hydroxyethyl - N-(3-(4-(7-ethoxycoumarin-3-yl)phenyl) - 1,2,4 - oxadiazol - 5 - yl)methyl piperidinium chloride 20 parts 3 - (4 - 5 - chloromethyl-1,2,4-oxadiazol-3-yl)phenyl)-7-ethoxy coumarin and 35 parts piperidine were heated to 100° for 3 hours and diluted with water; the solid was collected, washed and crystallised from ethanol. Yield of 13 parts 3-(4-(5-piperidinyl-methyl-1,2,4-oxadiazol-3-yl)phenyl)-7-ethoxycoumarin, m. pt. 166–168° was obtained. 5 parts of this compound and 20 parts 2-chloroethanol were refluxed for 3 hours and the mixture was then diluted with acetone and cooled. The solid was collected, washed with acetone and petroleum ether and dried. The yield was 5 pts. of title compound.
M. pt. 202° C.
$\lambda_{max}$. 348–9 m$\mu$, $E_1^1$ 695.

EXAMPLE 14

N,N - dimethyl - N - 2 - hydroxyethyl - N - (3 - (4-(7-ethoxycoumarin - 3 - yl)phenyl) - 1,2,4-oxadiazol-5-yl) methyl ammonium chloride 5 parts of 3 - (4 - (5 - dimethylaminomethyl-1,2,4-oxadiazol-3-yl)phenyl)-7-ethoxycoumarin (prepared as in Example 8) and 20 parts of 2-chloroethanol were refluxed for 8 hours, cooled and the reaction mixture diluted with acetone. The solid was collected, washed with acetone and petroleum spirit and dried. The yield was 2.4 parts of title compound.
M. pt. 198° C.
$\lambda_{max}$. 348 m$\mu$, $E_1^1$ 640.

EXAMPLE 15

N,N-Bis(2 - hydroxyethyl)-N-methyl-N-(3 - (4 - (7-ethoxy-coumarin - 3 - yl)phenyl) 1,2,4 - oxadiazol-5-yl)methyl ammonium methosulphate 8 parts 3 - (4 - (5 - chloromethyl-1,2,4-oxadiazol-3-yl) phenyl) - 7 - ethoxycoumarin, 5 parts 87% aqueous solution of diethanolamine, and 40 parts butanone were refluxed for 1 hour, cooled, and the solid collected and recrystallized from n-butanol. There were thus obtained 8.5 parts of 3-(4-(5-bis(2-hydroxyethyl)-aminomethyl-1, 2,4-oxadiazol - 3 - yl)-7-ethoxy)coumarin, m. pt. 174–6° C. 6 parts of this compound were refluxed in 60 parts butanone with 3 parts dimethyl sulphate for 4 hours, the reaction mixture cooled and the solid collected, washed with acetone and dried, to give a yield of 6 parts title compound.
M. pt. 231–4° C. (decomp.).
$\lambda_{max}$. 349 m$\mu$, $E_1^1$ 530.

EXAMPLE 16

Scoured polyacrylonitrile fibres were introduced into an aqueous bath (liquor:goods ratio 40:1) at 60° C. and they were treated with the compound of Example 1 (0.1–0.3% by weight of fibres), a non-ionic dispersing agent (0.5% by weight of fibres), 0.4 g./l. phosphoric acid (pH 2.5), 0.6 g./l. sodium chlorite and 0.5–1.0 g./l. sodium nitrate. The temperature was raised to 95° C. for 30 mins., maintained for 30 mins. at this temperature and then cooled to 50° C. The fibres were rinsed thoroughly and given an anti-chlor treatment of 1.0 g./l. sodium bisulphite and 1.0 g./l. sodium bicarbonate at 60° C. for 20 mins. The rinsed fibres exhibited a brilliant whiteness.

EXAMPLE 17

Cellulose triacetate fibres were treated in an aqueous bath (liquor:goods ratio 40:1) at 60° C. with the compound of Example 1 (0.1–0.3% by weight of fibres), a nonionic dispersing agent (0.5% by weight of fibres), 0.5 g./l. formic acid (pH 4), 2 g./l. sodium chlorite and 2 g./l. sodium nitrate. The temperature was raised to 95° C. for 30 mins., maintained for 30 mins. at this temperature and then cooled to 50° C. The fibres were rinsed thoroughly and given an anti-chlor treatment of 1 g./l. sodium bisulphite at 60° C. for 20 mins. After rinsing, the fibres exhibited a brilliant whiteness.

We claim:

1. A compound of the formula:

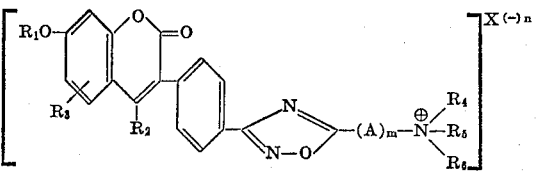

wherein:

$R_1$ is hydrogen or a lower alkyl group having 1–6 carbon atoms;

$R_2$ is hydrogen or a lower alkyl group having 1–6 carbon atoms;

$R_3$ is hydrogen, halogen or a lower alkyl or alkoxy group containing 1–6 carbon atoms;

$R_4$, $R_5$, and $R_6$ are the same or different and each is a lower alkyl group having 1–6 carbon atoms or a lower alkyl group having 1–6 carbon atoms substituted by hydroxy, carbethoxy, or carboxy; or $R_4$, $R_5$, and $R_6$ together with the adjacent nitrogen atom form a pyridine ring or a pyridine ring substituted by an alkyl group having 1–6 carbon atoms; or two of $R_4$, $R_5$, or $R_6$ together with the adjacent nitrogen atom form a piperidine ring or a piperidine ring substituted by an alkyl group having 1–6 carbon atoms with the remaining $R_4$, $R_5$ or $R_6$ group being a lower alkyl group having 1–6 carbon atoms or a lower alkyl group substituted by hydroxy, carbethoxy, or carboxy;

A is an alkylene group having 1–6 carbon atoms or a monocyclic arylene group;

m is 0 or 1;

X is the anion of an organic or inorganic acid; and n is the valency of the anion.

2. A compound as claimed in claim 1 wherein $R_1$ is a methyl or ethyl group.

3. A compound as claimed in claim 1 wherein $R_2$ is a methyl group.

4. A compound as claimed in claim 1 wherein $R_3$ is a methoxy group.

5. A compound as claimed in claim 1 wherein $R_4$, $R_5$ and $R_6$ each is a methyl or ethyl group, or together with the adjacent nitrogen atom represent a pyridyl group which may be unsubstituted or substituted by an alkyl group having 1–6 carbon atom.

6. A compound as claimed in claim 5 wherein the pyridyl group is substituted at the 2- or 4-position by a methyl group.

7. A compound as claimed in claim 1 wherein $R_4$, $R_5$ or $R_6$ is a 2-hydroxyethyl or carbethoxy methyl group, or wherein two of said groups together with the nitrogen atom is a piperidinyl group.

8. A compound as claimed in claim 1 wherein A is a methylene or ethylene group.

9. A compound as claimed in claim 1 wherein X is a halide or methosulphate ion.

10. A compound as claimed in claim 1, said compound being N - 3 - [4-(7-ethoxycoumarin-3-yl)phenyl]-1,2,4-oxadiazol-5-yl methylpyridinium chloride.

11. A compound as claimed in claim 1, said compound being N,N,N-trimethyl-N - 3-[4-(7-ethoxycoumarin-3-yl)phenyl] - 1,24 - oxadiazol - 5 yl methylammonium iodide.

12. A compound as claimed in claim 1, said compound being N,N,N - trimethyl-N-3-[4-(7-ethoxycoumarin-3-yl)phenyl] - 1,2,4 - oxadiazol-5-yl methylammonium methosulphate.

13. A compound as claimed in claim 1, said compound being N,N - bis(2 - hydroxyethyl)-N-methyl-N-(3-(4-(7-ethoxycoumarin - 3 - yl)phenyl) - 1,2,4-oxadiazol-5-yl) methyl ammonium methosulphate.

References Cited
UNITED STATES PATENTS

| | | | |
|---|---|---|---|
| 3,245,989 | 4/1966 | Palazzo | 260—247.2 |
| 3,444,180 | 5/1969 | Maeder et al. | 260—307 |
| 3,655,684 | 4/1972 | Osbond et al. | 260—307 G |
| 3,708,475 | 1/1973 | Kirchmayr | 260—240 C |

HENRY R. JILES, Primary Examiner

G. T. TODD, Assistant Examiner

U.S. Cl. X.R.

260—295 F, 307 G, 343.2; 252—543, 301.2 W